(12) United States Patent
Kis et al.

(10) Patent No.: US 9,224,064 B2
(45) Date of Patent: Dec. 29, 2015

(54) ELECTRONIC DEVICE, ELECTRONIC DEVICE OPERATING METHOD, AND COMPUTER READABLE RECORDING MEDIUM RECORDING THE METHOD

(71) Applicant: Samsung Electronics Co., Ltd., Suwon-si, Gyeonggi-do (KR)

(72) Inventors: Gennadiy Yaroslavovich Kis, Kyiv (UA); Fedor Ivanovych Zubach, Kyiv (UA); Kyu-Sung Cho, Suwon-si (KR); Ik-Hwan Cho, Suwon-si (KR); Oleksiy Seriovych Panfilov, Kiev (UA)

(73) Assignee: Samsung Electronics Co., Ltd., Suwon-si (KR)

( * ) Notice: Subject to any disclaimer, the term of this patent is extended or adjusted under 35 U.S.C. 154(b) by 28 days.

(21) Appl. No.: 14/181,147

(22) Filed: Feb. 14, 2014

(65) Prior Publication Data

US 2014/0233860 A1    Aug. 21, 2014

Related U.S. Application Data

(60) Provisional application No. 61/765,508, filed on Feb. 15, 2013.

(30) Foreign Application Priority Data

Jan. 27, 2014    (KR) ........................ 10-2014-0009598

(51) Int. Cl.
*G06K 9/46*    (2006.01)
*G06K 9/62*    (2006.01)
*G06T 7/00*    (2006.01)

(52) U.S. Cl.
CPC ............ *G06K 9/4671* (2013.01); *G06K 9/6211* (2013.01); *G06T 7/0042* (2013.01); *G06T 2207/20076* (2013.01)

(58) Field of Classification Search
CPC .......... G06K 9/00201; G06K 9/00208; G06K 9/22214; G06K 9/00221; G06K 9/00234; G06K 9/00248; G06K 9/00281; G06K 9/00362; G06K 9/00375; G06K 9/00382; G06K 9/00785; G06K 9/3208; G06K 9/3241; G06K 9/4671; G06K 9/6211; G06K 9/6292; G06T 5/00; G06T 5/001; G06T 7/0034; G06T 7/0042; G06T 7/0048; G06T 7/2033; G06T 7/204; G06T 2207/10016; G06T 2207/10028; G06T 2207/20076; H04N 5/232; H04N 5/23219; H04N 5/23229; H04N 5/235; H04N 5/2352; H04N 5/2354; G06F 3/011; G06F 3/0304; G06F 3/042
See application file for complete search history.

(56) References Cited

U.S. PATENT DOCUMENTS

| | | | |
|---|---|---|---|
| 8,503,760 B2 * | 8/2013 | Lee et al. | 382/154 |
| 2003/0169906 A1 * | 9/2003 | Gokturk et al. | 382/190 |
| 2005/0286767 A1 * | 12/2005 | Hager et al. | 382/190 |
| 2012/0106784 A1 * | 5/2012 | Cho et al. | 382/103 |
| 2012/0106800 A1 * | 5/2012 | Khan et al. | 382/104 |

* cited by examiner

*Primary Examiner* — Jose Couso
(74) *Attorney, Agent, or Firm* — Jefferson IP Law, LLP

(57) ABSTRACT

A method for operating an electronic device is provided. The method includes detecting a plurality of feature points in at least a partial region in a digital image, selecting at least two feature points from the detected plurality of feature points, determining whether there is a probability that an object existing in at least one of a plurality of reference images exists in the digital image, by using at least a portion of the at least two feature points, and determining a pose of the object after the probability that the object exists in the digital image is determined.

15 Claims, 11 Drawing Sheets

ELECTRONIC DEVICE, ELECTRONIC DEVICE OPERATING METHOD, AND COMPUTER READABLE RECORDING MEDIUM RECORDING THE METHOD

CROSS-REFERENCE TO RELATED APPLICATION(S)

This application claims the benefit under 35 U.S.C. §119 (e) of a U.S. Provisional application filed on Feb. 15, 2013 in the U.S. Patent and Trademark Office and assigned Ser. No. 61/765,508, and under 35 U.S.C. §119(a) of a Korean patent application filed on Jan. 27, 2014 in the Korean Intellectual Property Office and assigned Serial number 10-2014-0009598, the entire disclosure of each of which is hereby incorporated by reference.

TECHNICAL FIELD

The present disclosure relates to a method for operating an electronic device.

BACKGROUND

In general, Virtual Reality (VR) refers to a lifelike environment or situation created by computer graphics. VR provides an interface that allows people to perceive a virtual environment or situation via their senses and produces a feeling that a user actually interacts with the virtual environment or situation. A user may interact with virtual reality in real time and have a sensory experience similar to that of reality through device control.

In addition, Augmented Reality (AR) is one field of virtual reality, and refers to a computer graphic technology that combines virtual objects or information with the real environment to make the virtual objects or information appear as if they exist in the original environment. AR is a technology for overlaying virtual objects on the real world as seen through the user's eyes, and is also referred to as Mixed Reality (MR) because the real world is mixed with additional information and a virtual world and displays the mixture as one image.

Further, as mobile devices (e.g., a smart phone, a tablet PC, etc.) are gaining popularity, the virtual reality technology may frequently and easily found in various services such as education, games, navigation, advertisements, and blogs. As wearable devices are now commercially available, research on the virtual reality technology has become more active.

Accordingly, an Augmented Reality (AR) with features and descriptors that may be calculated on image data, an object on the image data recognized using the calculated features and descriptors, and localization (initial pose calculation) of the recognized object is desired.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide Augmented Reality (AR), features and descriptors may be calculated on image data, an object on the image data may be recognized using the calculated features and descriptors, and localization (initial pose calculation) of the recognized object may be performed.

However, the number of features on an object included in image data may be proportional to an object area, and when an object occupies a small area in the whole image, there may not be enough features for localization of the object. Also, the farther an object is, the less dense feature positions are, and thus the less precise object pose calculation is.

Another aspect of the present disclosure is to provide an electronic device, an electronic device operating method, and a computer readable recording medium recording the method, which may enhance processing speed and increase calculation efficiency by performing localization for a Region Of Interest (ROI), a region in the whole image that has a high probability of containing an object, when calculating a pose of the object included in the image.

In accordance with an aspect of the present disclosure, a method for operating an electronic device is provided. The method includes detecting a plurality of feature points in at least a partial region in a digital image, selecting at least two feature points from the detected plurality of feature points, determining whether there is a probability that an object existing in at least one of a plurality of reference images exists in the digital image, by using at least a portion of the at least two feature points, and determining a pose of the object after the probability that the object exists in the digital image is determined.

In accordance with another aspect of the present disclosure, an electronic device is provided. The electronic device includes a memory configured to store a digital image, and a processor configured to process the digital image, wherein the processor is configured to detect a plurality of feature points in at least a partial region in the digital image, select at least two feature points from the detected plurality of feature points, determine whether there is a probability that an object existing in at least one of a plurality of reference images exists in the digital image, by using at least a portion of the at least two feature points, and determine a pose of the object after the possibility that the object exists in the digital image is determined.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
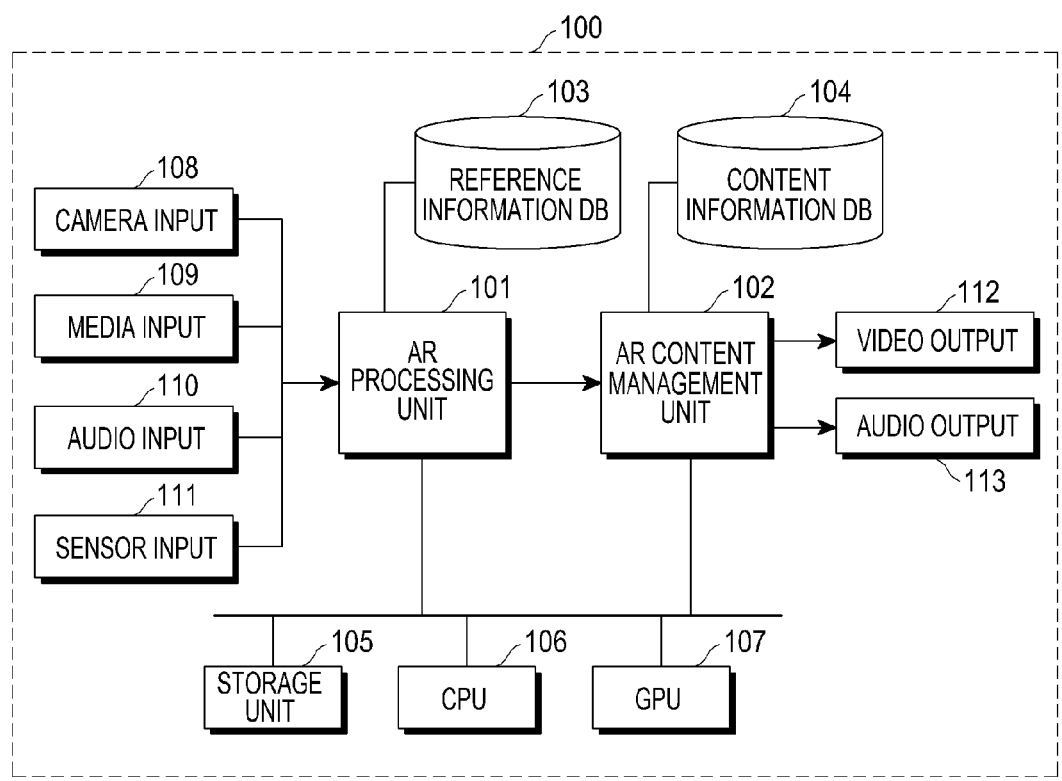
FIG. 1 is a block diagram illustrating an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

While terms including ordinal numbers, such as "first" and "second," etc., may be used to describe various components, such components are not limited by the above terms. The above terms are used merely for the purpose of distinguishing an element from another. For example, a first element may be termed a second element, and likewise a second element may be termed a first element without departing from the scope of the present disclosure. As used herein, the term "and/or" encompasses any one or combination of plural relevant items.

The terms used herein are merely for the purpose of describing particular embodiments and are not intended to limit the present disclosure. As used herein, the singular forms are intended to include the plural forms as well, unless the context clearly indicates otherwise. The terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Unless defined otherwise, all terms used herein, including technical terms and scientific terms, have the same meaning as commonly understood by those of skill in the art. Such terms as those defined in a generally used dictionary are to be interpreted to have the meanings equal to the contextual meanings in the relevant field of art, and are not to be interpreted to have ideal or excessively formal meanings unless clearly defined in the present specification.

In order to implement Augmented Reality (AR), various embodiments of the present disclosure disclose a method of performing pose calculation (e.g., localization) of an object located far from a camera, and the like.

In the following description of various embodiments of the present disclosure, an "electronic device" may be any device equipped with at least one processor, and may include a camera, a portable device, a mobile terminal, a communication terminal, a portable communication terminal, a portable mobile terminal, and the like. For example, the electronic device may be a digital camera, a smart phone, a cellular phone, a gaming machine, a TeleVision (TV), a display device, a head unit for a motor vehicle, a notebook computer, a laptop computer, a tablet computer, a Personal Media Player (PMP), a Personal Digital Assistant (PDA), a navigation device, an Automated Teller Machine (ATM) for banking, a POS device at a shop, or the like. Further, the electronic device in various embodiments of the present disclosure may be a flexible device or a flexible display unit. Further, the electronic device in various embodiments of the present disclosure may be a wearable device (e.g., watch type device, glass type device, suit type device, etc.).

Hereinafter, various embodiments of the present disclosure will be described in detail with reference to the accompanying drawings so that a person having ordinary skill in the art may easily embody the present disclosure.

A structure of a system and apparatus according to an embodiment of the present disclosure will be first described with reference to FIGS. 1 to 4, and then a procedure according to an embodiment of the present disclosure will be described in detail with reference to FIGS. 7 and 8.

FIG. 1 illustrates an electronic device according to an embodiment of the present disclosure.

Referring to FIG. 1, the electronic device 100 according to an embodiment of the present disclosure may include an AR processing unit 101 and an AR content management unit 102. Also, the electronic device 100 according to an embodiment of the present disclosure may further include a reference information DataBase (DB) 103, a content information DB 104, a storage unit 105, a CPU 106, a GPU 107, and the like.

The AR processing unit 101 may receive data input from several input units such as a camera input module 108, a media input module 109, an audio input module 110, and a multi-sensor input module 111. The sensor input data may include input data from an accelerometer (not illustrated), a gyroscope (not illustrated), a magnetic sensor (not illustrated), a temperature sensor (not illustrated), a gravity sensor (not illustrated), and the like.

The AR processing unit 101 may use the storage unit 105, the CPU 106, and the GPU 107 for processing of input data. The AR processing unit 101 may use the reference information DB 103 to identify and recognize target objects. An output from the AR processing unit 101 may include, for example, identification information and localization information.

The localization information may be used to determine a 2D/3D pose of a target object. The identification information may be used to determine what the target object is. The AR content management unit 102 may be used to organize a final video/audio output via the video output module 112 and audio output module 113 with an output from the AR processing unit 101 and contents from the remote/local content information DB 104.

Figure 2:
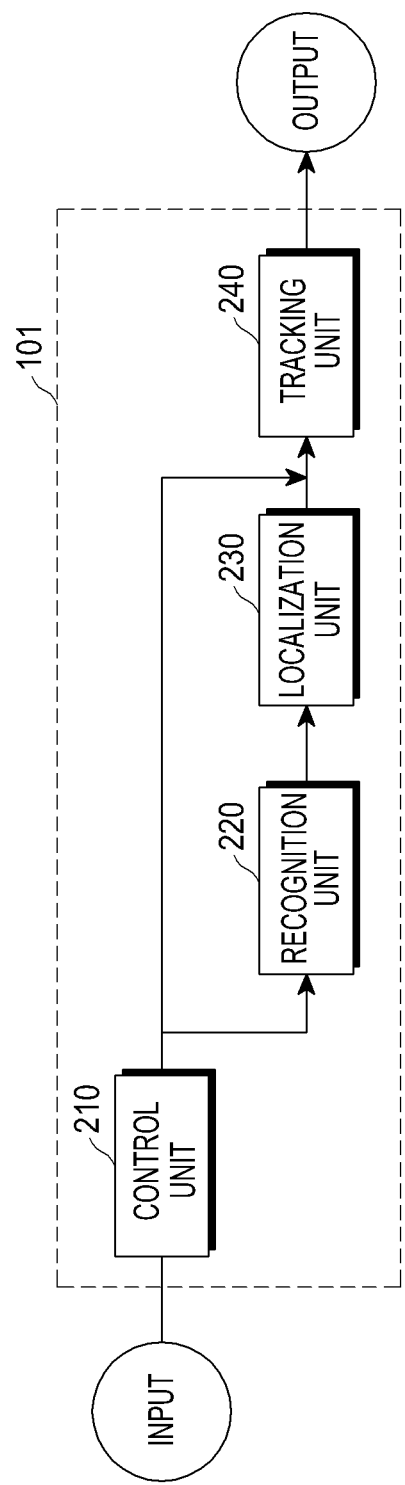
FIG. 2 is a block diagram illustrating a structure of an Augmented Reality (AR) processing unit according to an embodiment of the present disclosure.

FIG. 2 illustrates a configuration of the AR processing unit 101, illustrated in FIG. 1 according to an embodiment of the present disclosure.

Referring to FIG. 2, the AR processing unit 101 according to an embodiment of the present disclosure may include at least one of a control unit 210, a recognition unit 220, a localization unit 230, and a tracking unit 240.

The control unit 210 may determine whether to branch into recognition processing through the recognition unit 220 or proceed to tracking processing through the tracking unit 240. While the recognition processing through the recognition unit 220 may be performed in parallel with the tracking processing through the tracking unit 240, the control unit 210 makes the determination to perform optimized processing by using a given input. As an example, main processing through the AR processing unit 101 may include three steps of "recognition", "localization", and "tracking".

The recognition unit 220 may identify a target object, based at least partially on reference information provided through the local/remote reference information DB 104, if necessary.

Figure 4:
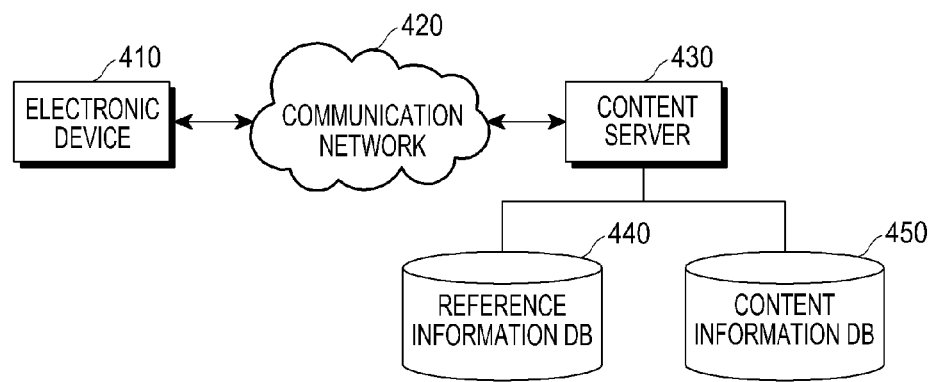
FIG. 4 is a block diagram illustrating a system according to an embodiment of the present disclosure.

In various embodiments of the present disclosure, the recognition unit 220 may need reference information for a specific recognized target object. The reference information may be internal information provided through the local reference information DB 103 that is located inside of the electronic device 100 as shown in FIG. 1, or external information provided through the remote reference information DB 440 that is located remote from the electronic device 410 as illustrated in FIG. 4. As an example, face recognition may make reference to an external reference face DB in order to recognize authorized faces and identify different faces. However, a Quick Response (QR) code may generally have internal reference data of the electronic device because the QR code needs only some specific rules, and in normal cases, does not have to be dynamically updated.

The localization unit 230 may localize a recognized target object, that is, calculate the initial pose of a recognized target object. Subsequently, the tracking unit 240 may dynamically calculate a pose of a target object to keep tracking of the object, and initial information for estimating a pose of the object is derived from an output from the localization unit 230. Finally, the tracking unit 240 may have a basic output of recognition information and localization information including an object pose.

Figure 3:
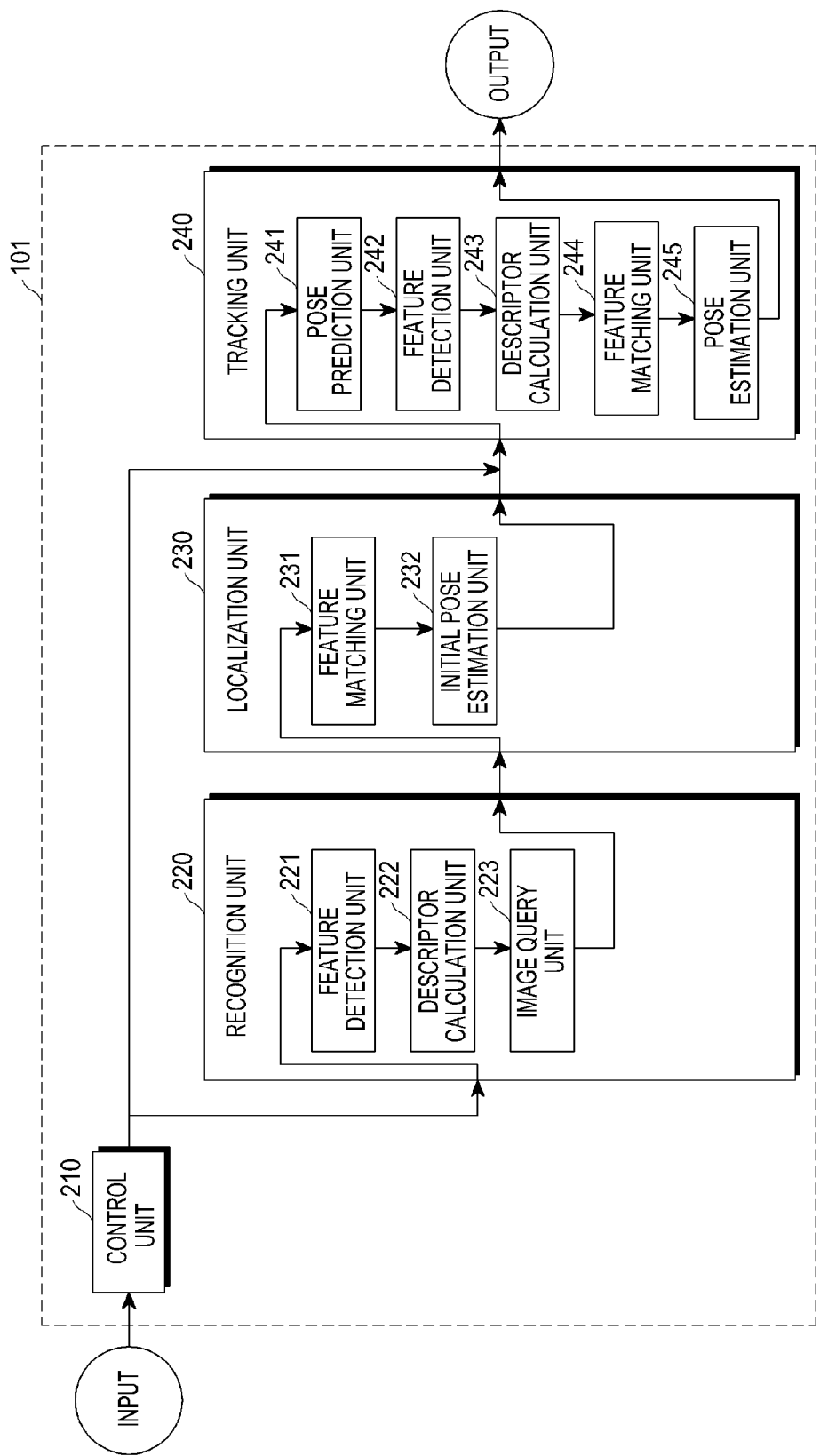
FIG. 3 is a block diagram illustrating a detailed structure of an AR processing unit according to an embodiment of the present disclosure.

FIG. 3 illustrates a detailed structure of an AR processing unit 101 according to an embodiment of the present disclosure. As an example, detailed functional units for each processing block included in the AR processing unit of FIG. 2 may be as illustrated in FIG. 3.

Referring to FIG. 3, the recognition unit 220 may include a feature detection unit 221, a descriptor calculation unit 222, and an image query unit 223.

When image data is input, the feature detection unit 221 may detect features in the input image data. The feature detection unit 221 may transmit the detected features to the descriptor calculation unit 222.

The descriptor calculation unit 222 may calculate and generate descriptors by using the detected features, received from the feature detection unit 221, and may transmit the generated descriptors to the image query unit 223.

The descriptor calculation unit 222 may be configured to recognize one or more objects on the digital image, and may determine descriptors to be used to recognize the objects according to various embodiments of the present disclosure.

In order to determine a descriptor to be used for object recognition, the descriptor calculation unit 222 may use at least some of the position, orientation, and/or scale of a feature on the image to determine the descriptor.

In order to determine a descriptor to be used for object recognition, the descriptor calculation unit 222 may determine intensity gradients of pixels located within a region around the feature. The descriptor calculation unit 222 may determine the intensity gradients of pixels with respect to two or more fixed non-orthogonal orientations different from the orientation of the feature. The descriptor calculation unit 222 may convert the intensity gradients, determined with respect to the fixed orientations, to those corresponding to the orientation of the feature.

The descriptor calculation unit 222 may set a region around the feature, which includes sub-regions divided with respect to the orientation of the feature and an orientation orthogonal thereto, and the divided sub-regions may overlap each other at their boundaries.

The image query unit 223 may detect at least one reference image data corresponding to the input image data in the local reference information DB 103 or the remote reference image information DB 440 by using the calculated descriptors, received from the descriptor calculation unit 220, and may recognize an object on the input image data through the detected at least one reference image data.

The localization unit 230 may calculate the initial pose of an object identified through feature detection in the input image data, that is, perform localization of a recognized object. The localization unit 230 may include a feature matching unit 231 and an initial pose estimation unit 232.

The feature matching unit 231 may perform a matching procedure for the features by using the calculated descriptors, received from the recognition unit 220, and may transmit matching information for the features to the initial pose estimation unit 232.

The initial pose estimation unit 232 may estimate the initial pose of an object included in the input image data through the matching information for the features, received from the feature matching unit 231.

The initial pose calculation (localization) by the localization unit 230 may be implemented in various ways according to various embodiments of the present disclosure, and a detailed description thereof will be given below in conjunction with FIG. 5.

The tracking unit 240 may dynamically track object pose changes in image data input in sequence.

The tracking unit 240 may obtain initial information, by which the initial pose of an object included in input image data may be estimated, from the localization unit 230 and subsequently keep tracking the object in image data received in sequence to dynamically calculate changes in the pose of the object. The tracking unit 240 may output recognition information representing the type of an object and local information representing the pose of the object in each of input image data received in sequence.

The tracking unit 240 may include an object pose prediction unit 241, a feature detection unit 242, a descriptor calculation unit 243, a feature matching unit 244, and a pose estimation unit 245.

The object pose prediction unit 241 may predict the pose of an object in a next input image data through the pose of the object, estimated in each of at least one previously input image data.

The feature detection unit 242 may detect features in input image data that are received in sequence after the initial pose estimation of the object included in the input image data, and may transmit the detected features to the descriptor calculation unit 243.

The descriptor calculation unit 243 may calculate descriptors by using the features of the input image data, received from the feature detection unit 242, and may transmit the calculated descriptors to the feature matching unit 244.

The feature matching unit 244 may perform a matching procedure for the features by using the calculated descriptors, received from the descriptor calculation unit 243, and may transmit matching information for the features to the pose estimation unit 245.

The pose estimation unit 245 may dynamically estimate object pose changes in each of the at least one image data received in sequence by using the matching information for the features, received from the feature matching unit 244, and may output recognition information representing the type of an object included in each input image data and local information representing the pose of the object.

FIG. 4 illustrates a system according to an embodiment of the present disclosure.

Referring to FIG. 4, the system according to an embodiment of the present disclosure may include an electronic device 410, a communication network 420, and a content server 430.

The electronic device 410 may include at least some or all of the functions of the electronic device 100 as described above in FIG. 1.

The communication network 420 may be implemented regardless of its communication type such as wired communication or wireless communication, and may be implemented as various communication networks including a Personal Area Network (PAN), a Local Area Network (LAN), a Metropolitan Area Network (MAN), a Wide Area Network (WAN), and the like. Further, the communication network 420 may be a known World Wide Web (WWW), and may use a wireless transmission technology employed in short range communication, such as Infrared Data Association (IrDA) or Bluetooth. Further, the communication network 420 may include a cable broadcasting communication network, a terrestrial broadcasting communication network, a satellite broadcasting communication network, or the like for receiving a broadcasting signal.

The content server 430 may perform at least one of a function of recognizing an object, a function of localization of the recognized object, and a function of tracking the object according to various embodiments of the present disclosure. For example, various functions according to various embodiments of the present disclosure, which may be processed in the electronic device 100 of FIG. 1, may be processed by the electronic device 410 and the content server 430 of FIG. 4 in a distributed manner.

Further, the content server 430 may include a reference information DB 440 and a content information DB 450, and may provide reference information stored in the reference information DB 440 and content information stored in the content information DB 450 to the electronic device 410 at the request of the electronic device 410.

In various embodiments of the present disclosure, each functional unit and each module may be a functional or structural coupling of hardware for implementing the technical idea of various embodiments of the present disclosure and software for operating the hardware. As an example, each functional unit may be a logical unit of a predetermined code and a hardware resource for performing the predetermined code, and a person having ordinary skill in the art will easily appreciate that each functional unit does not necessarily mean a physically coupled code or a kind of hardware.

Figure 11:
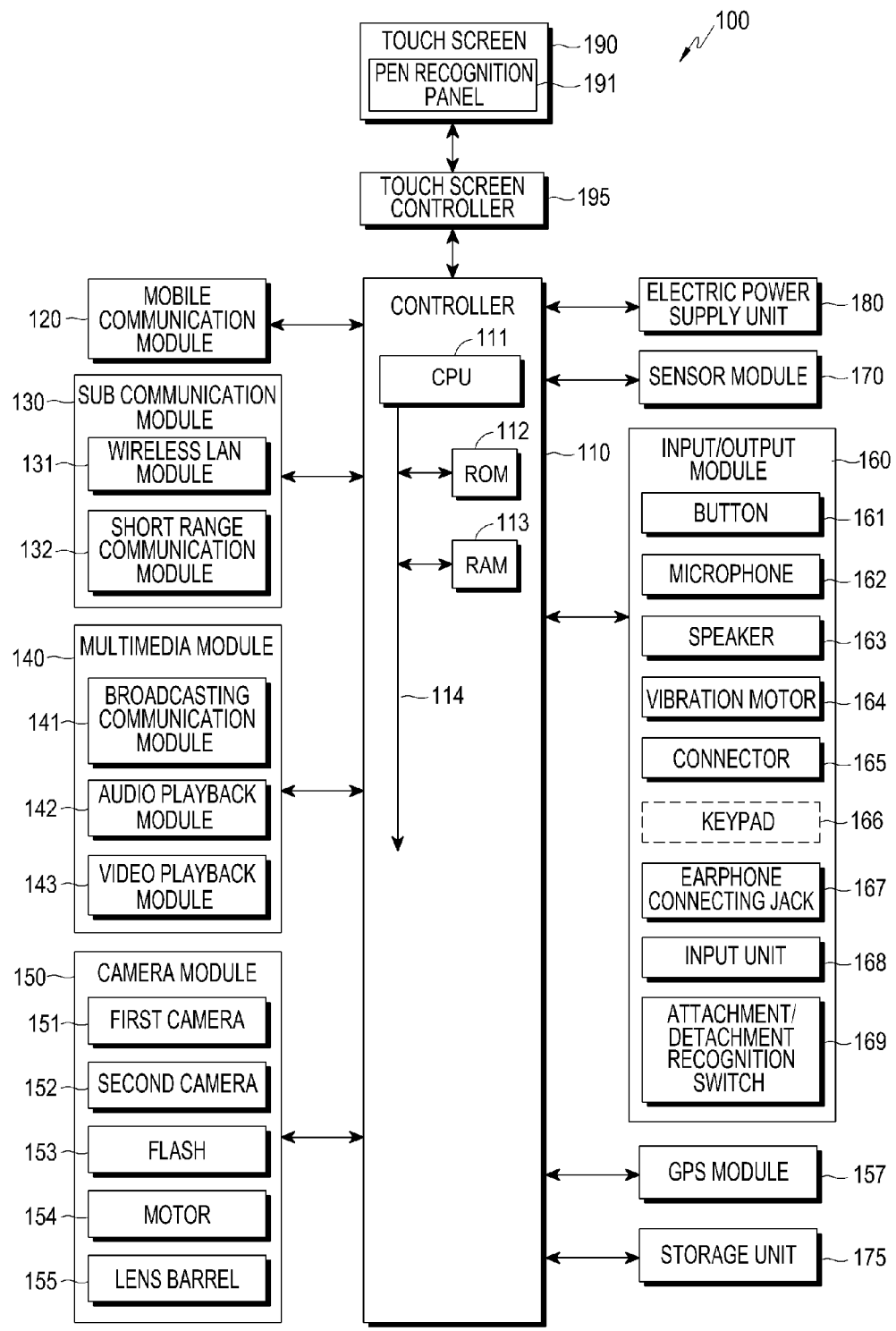
FIG. 11 is a block diagram illustrating a detailed structure of an electronic device according to an embodiment of the present disclosure.

Further, the implementations described in connection with one or more of FIGS. 1 to 4 may be at least a part of a system or device as shown in FIG. 11 and/or FIG. 12. The above drawings and descriptions thereof provide various implementations, and are not intended to limit the scope of the present disclosure. The implementations described and shown above may be adjusted to be applied to various embodiments of the present disclosure. Those skilled in the art will appreciate that one or more constituent elements described and/or shown above may be omitted or modified in various embodiments of the present disclosure. Additionally, other constituent elements may be added to various embodiments of the present disclosure, if necessary. In various embodiments of the present disclosure, one or more methods, steps, or algorithms may be performed or executed using one or more constituent elements described and/or shown in the above implementations.

Hereinafter, a method of calculating the initial pose of an object included in an image through the localization unit 230 according to an embodiment of the present disclosure will be described in detail with reference to FIGS. 5 to 10.

Figure 5:
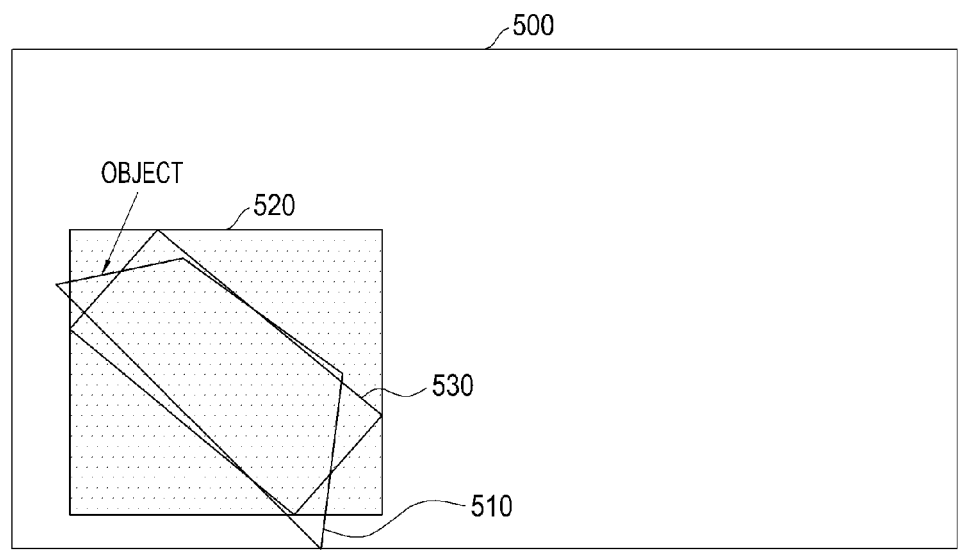
FIG. 5 is a view illustrating a Region Of Interest (ROI) set in an image according to an embodiment of the present disclosure.

FIG. 5 illustrates a Region Of Interest (ROI) set in an image according to an embodiment of the present disclosure.

Referring to FIG. 5, when rough pose calculation (e.g., 2D pose calculation of 4 Degrees of Freedom (DoF)) is performed in the whole input image 500, a region having a high probability that a corresponding identified object is located therein may be set as a ROI 520, along with a rough object pose 530. According to an embodiment of the present disclosure, 3D object pose 510 may be calculated by performing initial 6 DoF pose of the object for the ROI 530.

Figure 6A:
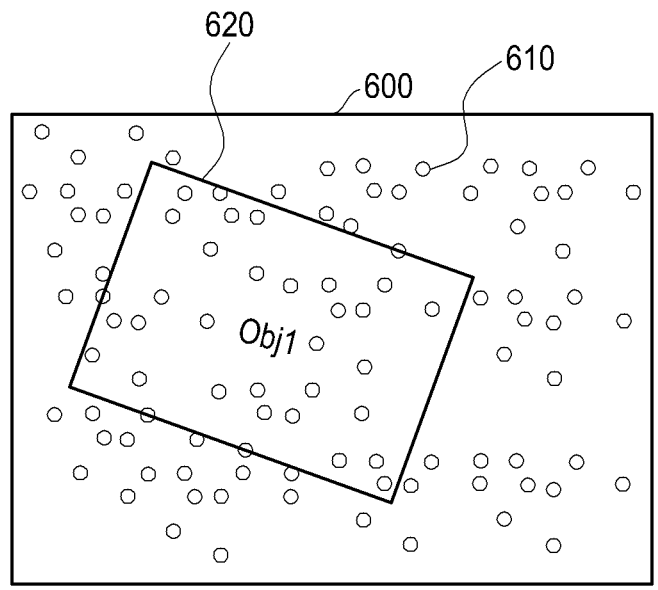
FIGS. 6A and 6B are views illustrating comparison between a large-sized object and a small-sized object according to an embodiment of the present disclosure.
Figure 6B:
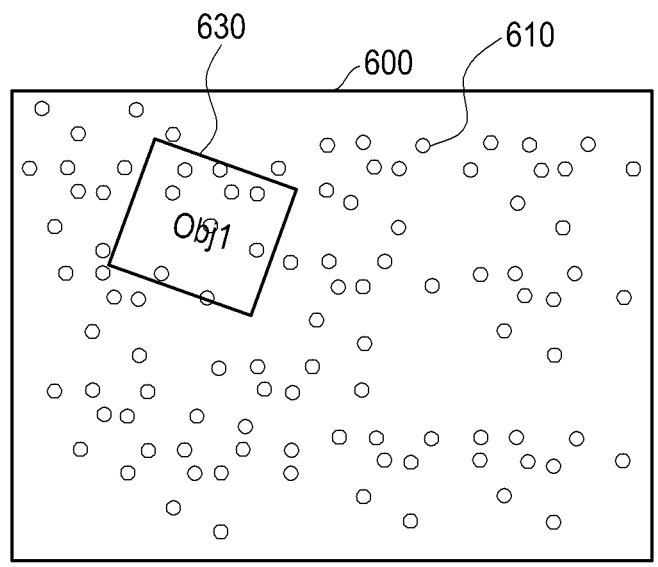

FIGS. 6A and 6B show comparison between a large-sized object and a small-sized object according to an embodiment of the present disclosure.

Referring to FIGS. 6A and 6B, an object pose may be calculated by extracting features 610 in the whole image 100 and matching the extracted features with those in a reference image. In the case of FIG. 6A, since an object 620 occupies a relatively large area in the whole image 600, the object may be detected even by 3D pose calculation. However, in the case of FIG. 6A, since an object 630 occupies a relatively small area in the whole image 600, the object may not be detected by 3D pose calculation. In various embodiments of the present disclosure, since a 2D rough object pose is calculated and then a 3D object pose is calculated, object pose calculation is possible even when the object 630 occupies a small area as in FIG. 6B.

Hereinafter, a procedure of performing localization of an object according to an embodiment of the present disclosure will be described in detail with reference to FIGS. 7 and 8.

Figure 7:
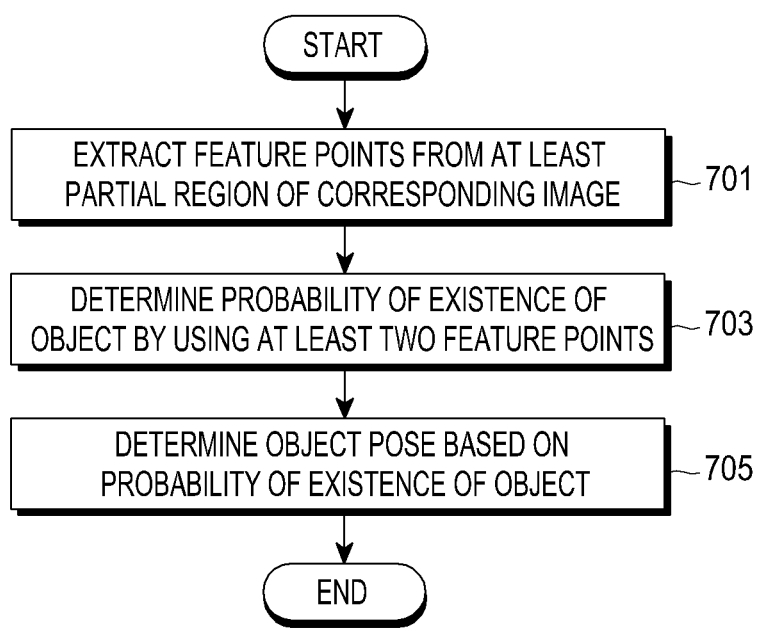
FIG. 7 is a flowchart illustrating a procedure of operating an electronic device according to an embodiment of the present disclosure.

FIG. 7 illustrates a procedure of operating an electronic device according to an embodiment of the present disclosure.

Referring to FIG. 7, in operation 701, feature points may be detected in at least a partial region of a corresponding image. In operation 703, the probability of the existence of an object may be determined using at least two of the detected feature points. In operation 705, the pose of the object may be determined based on the probability of the existence of the object. More specially, as an example, the object included in the corresponding image may be identified by matching the already detected feature points with those in a reference image. The region where the identified object is located may be set as an ROI, and object pose calculation may be performed for the ROI.

Figure 8:
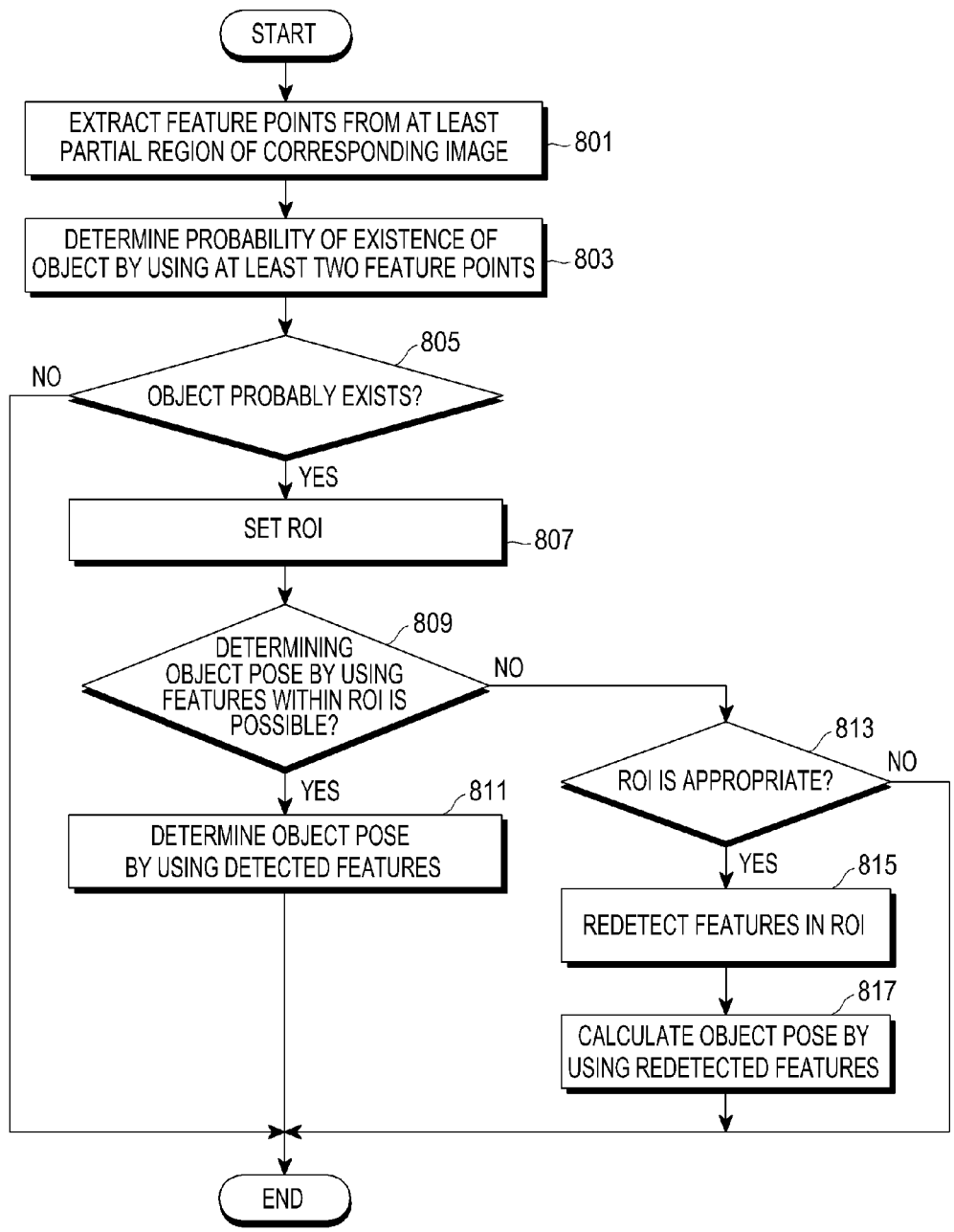
FIG. 8 is a flowchart illustrating a procedure of operating an electronic device according to an embodiment of the present disclosure.

FIG. 8 illustrates a procedure of operating an electronic device according to an embodiment of the present disclosure.

Referring to FIG. 8, in operation 801, feature points may be detected in at least a partial region of a corresponding image. In operation 803, the probability of the existence of an object may be determined using two of the detected feature points.

In operation 805, when the determination shows that an object probably exists, a region where the probability of the existence of the object is high may be set as an RPI in operation 807. However, in operation 805 when the determination shows that an object probably does not exists, end processing. In operation 809, determine whether it is possible to determine the object's pose by using feature points within the ROI. When the determination shows that it is possible to determine the object's pose, in operation 811, the object's pose may be determined using the detected feature points.

However, when the determination in operation 809 shows that it is not possible to determine the object's pose, in operation 813, determine whether the set ROI is appropriate. When the determination shows that the set ROI is appropriate, feature points may be redetected in the ROI in operation 815, and the object's pose may be calculated using the redetected feature points. However, in operation 813, when it is not determined whether the set ROI is appropriate, end processing.

Figure 9A:
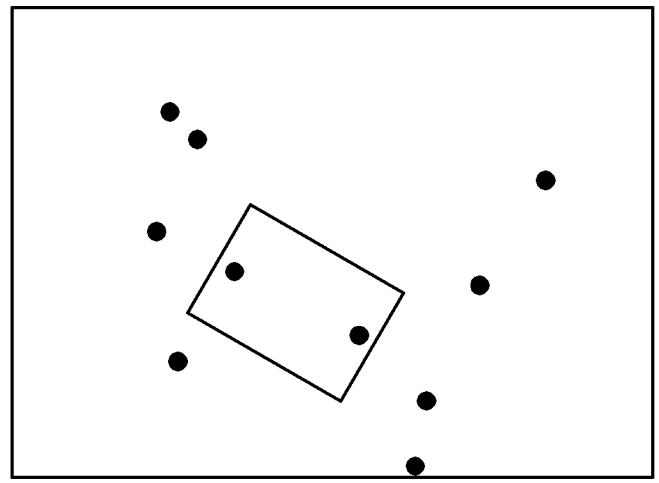
FIGS. 9A and 9B are views each illustrating an ROI and features according to an embodiment of the present disclosure.
Figure 9B:
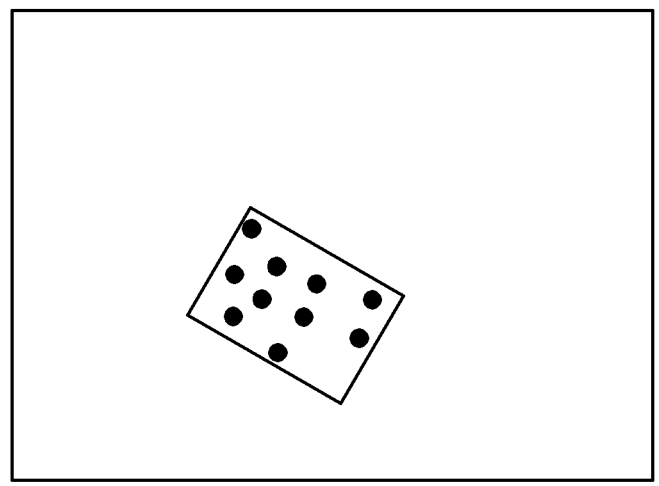

FIGS. 9A and 9B illustrate an ROI and features according to an embodiment of the present disclosure.

Referring to FIG. 9A, for example, features may be detected in the whole image region, a rough object pose may be calculated using the detected features, and then a region where the object probably exists may be set as an ROI.

Referring to FIG. 9B, illustrates that features may be redetected in the set ROI and the object's pose may be determined using the redetected features.

Figure 10A:
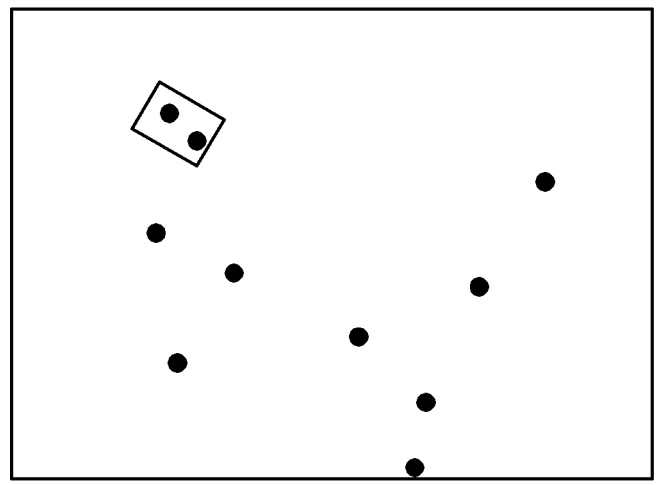
FIGS. 10A and 10B are views illustrating ROIs according to an embodiment of the present disclosure.
Figure 10B:
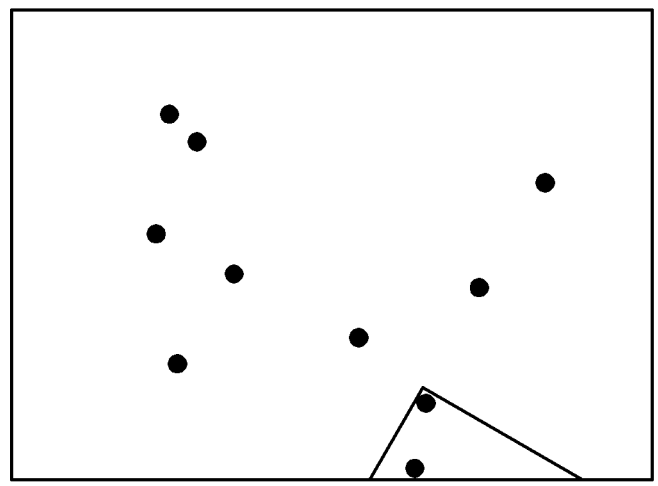

FIGS. 10A and 10B illustrate ROIs according to an embodiment of the present disclosure.

Referring to FIGS. 10A and 10B, as an example, when an ROI is too small to determine an object's pose, as shown in FIGS. 10A and 10B, the procedure may be terminated without feature redetection in the ROI.

Hereinafter, a localization method according to various embodiments of the present disclosure will be described in more detail.

Localization (e.g., finding a 6 DoF pose relative to a video-in device) of objects in a camera view is one of main tasks of AR. A feature-based approach with matching of descriptors configured by feature locality may be used for localization.

One of the difficult situations for localization is when an object occupies a small area in a camera view, which means that only a part of an object is observed or an object is placed far from a camera due to a relatively low number of features lying inside the area, as shown in FIG. 9A or 9B.

In feature-based approaches of object localization, features on a processed image are distributed as uniformly as possible, and consequently there may be some features on an object no matter where the object is located. However, the number of features on an object may be proportional to an object area, and for a small area, there may not be enough features to find an object pose. Moreover, the farther an object is, the less dense feature positions are, and thus the less precise object pose calculation is.

The localization method according to various embodiments of the present disclosure may set a Region Of Interest (ROI) for feature detection (e.g., FAST, AGAST, Hessian affine region detector, etc.), a feature descriptor (e.g., SIFT, SURF, BRISK, FREAK, etc.), a feature matching algorithm (e.g., brute-force, using KD-tree, Locality Sensitive Hashing, etc.), and an object pose calculation algorithm (e.g., RANSAC, PROSAC, M-estimator, etc.).

As described above, localization may include the following steps.

1. Feature detection.
2. Feature descriptor calculation and feature matching.
3. Object pose calculation.

More specially, the localization method according to various embodiments of the present disclosure may additionally include the following steps, as also shown in FIG. 8.

<Step 1—Extract Features from Image>

Features may be extracted from the whole image by using a feature detector, and the result of the feature detector may be a frame-image with features.

<Step 2—Find Matches>

Once features are extracted in step 1, feature descriptors may be calculated from the extracted features, and may be used to find matches for the respective features by a matching algorithm.

<Step 3—Calculate Rough Object Pose and Filter Matches>

In various embodiments of the present disclosure, rough object pose calculation may be performed as an additional step for localization.

As an example, the localization method according to various embodiments of the present disclosure may use an additional step after the feature matching (e.g., a step of finding an ROI where an object may be). This step may reduce computational costs incurred by the object pose calculation step, and if this step fails, then no pose calculation may be performed. Also, this step may include filtering of matches to improve the performance of further object pose calculation.

An ROI for an object is searched for based on rough object pose calculation (e.g., calculation of the approximation of an object pose with a smaller number of DoF and a bigger re-projection error. Elimination of any number of degrees of freedom may give a certain rough pose model. Depending on a selected rough pose model, it may reduce the minimum number of matches and/or the processing time required to calculate the model, and thus may be processed faster than typical object pose calculation.

FIG. 5 described above shows relations between an object's pose 510, a rough pose 530, and an ROI 520 in the whole image 500.

Rough model selection depends on localization tasks. If localization is attempted for a smaller picture inserted into a certain location of a bigger picture without substantial changes of a view point, then there may be just 2 degrees of freedom for the smaller picture (2D coordinates of the smaller picture). The corresponding minimum number of matches for calculation of this rough pose model is just 1.

In general, feature descriptors have low robustness to perspective distortion, and for them, the 6DoF pose of a planar object in a 3D space may be calculated only for weak perspective distortion. In this case, a pose model with no perspective distortion (4DoF) may be used as a rough object pose, and it requires 2 matches to be calculated (contrarily, a 6DoF pose requires at least 3 matches to be calculated).

The weak perspective 4DoF rough object pose described above may be expressed by a similarity transform as given in the following Equation 1.

$$\begin{pmatrix} x' \\ y' \end{pmatrix} = \begin{bmatrix} a & -b \\ b & a \end{bmatrix} \cdot \begin{pmatrix} x \\ y \end{pmatrix} + \begin{pmatrix} c \\ d \end{pmatrix} \quad \text{Equation 1}$$

In Equation 1, $$P = \begin{pmatrix} x \\ y \end{pmatrix}$$

is a point on a reference image, and $$\dot{P} = \begin{pmatrix} x' \\ y' \end{pmatrix}$$

is a point on the current input image.

Equation 1 may be expressed as homology of the following Equations 2 and 3.

$$H = \begin{bmatrix} a & -b & c \\ b & a & c \\ 0 & 0 & 1 \end{bmatrix} \quad \text{Equation 2}$$

$$\begin{pmatrix} x' \\ y' \\ 1 \end{pmatrix} = H \cdot \begin{pmatrix} x \\ y \\ 1 \end{pmatrix} \quad \text{Equation 3}$$

The above rough object pose calculation may be performed using any model calculation method such as robust hypothesize-to-verify methods (RANSAC, PROSAC), M-estimators, and the like.

Depending on the number of matches, similarity transform calculation may be tested using brute-force (from 2 to 9 matches), RANSAC (from 10 to 29 matches), and PROSAC (30 matches or more) methods. A weak perspective 4DoF model calculation formula for just 2 matches $\{(P_1, \dot{P}_1), (P_2, \dot{P}_2)\}$ is given in the following Equation 4, where $P_1 \neq P_2$ and $\dot{P}_1 \neq \dot{P}_2$.

$$a = \frac{(x_1 - x_2) \cdot (x'_1 - x'_2) + (y_1 - y_2) \cdot (y'_1 - y'_2)}{(x_1 - x_2)^2 + (y_1 - y_2)^2}$$

$$b = \frac{(x_1 - x_2) \cdot (y'_1 - y'_2) + (y_1 - y_2) \cdot (x'_1 - x'_2)}{(x_1 - x_2)^2 + (y_1 - y_2)^2}$$

$$c = x'_1 - a \cdot x_1 + b \cdot y_1$$

$$b = y'_1 - b \cdot x_1 - a \cdot y_1$$

Model refinement using the best consensus set obtained by a robust hypothesize-to-verify method may be made by a least square method.

If the number of inliers (matches supporting the model) is not less than a predetermined threshold (e.g., a threshold value of 4 may be used), the rough object pose may be considered to be successfully calculated. If the rough object pose calculation is successful, outliers (matches not supporting the model) are filtered off, and will not participate in object pose calculation. This may also increase the performance and success rate of object pose calculation.

The rough pose describes the rough area of the object, and may be approximated by a rectangle for feature detection purposes, if needed, as shown in FIG. 5. In various embodiments of the present disclosure, this is called the object's ROI as described above.

When the object's ROI is set as a rectangle, if both sides of the ROI rectangle are within certain boundaries (e.g., not more half of the image width and not less than 30 pixels are selected to get enough features from the ROI for localization), and object pose calculation using the remaining matches fails, then localization by the ROI may be performed according to various embodiments of the present disclosure. Accordingly, features may be extracted only from the ROI, and consequently there may be more features on the object. This makes it possible to obtain more matches, and may increase the probability of finding the object pose when the object occupies a small area in the input image.

<Step 4—Calculate Object Pose>

In this way, filtered matches may be used in object pose calculation. If object pose calculation is unsuccessful, and both sides of the ROI rectangle are within certain boundaries (e.g., not more half of the image width and not less than 30 pixels are selected to get enough features from the ROI for localization), then localization by the ROI may be performed.

Otherwise, if either the object pose is calculated and the result is already obtained, or the ROI size is too small to obtain enough features from the ROI for localization or too big to gain some advantage from using a part of the image instead of the whole image, then next steps may not be performed.

<Step 5—Extract Features from Object's ROI>

ROI processing may be used both for the image where the object pose was calculated and for next images from input image streams from the video-in device. In the latter case, assuming that the object's shift on the next image is small relative to the previous image or may be calculated using other techniques (e.g., phase correlation, motion model, etc.), ROI processing may be applied to the shift ROI.

Features may be extracted from the object's ROI on the image by using a feature detector. The result is a frame-image with features belonging to the ROI.

Next, a step of finding matches for the features belonging to the ROI and a step of calculating the object pose may be performed.

An electronic device that performs object pose calculation according to various embodiments of the present disclosure as described above may be any electronic device including a control unit (processor), and may be called a camera, a portable device, a mobile terminal, a communication terminal, a portable communication terminal, or a portable mobile terminal. As an example, the electronic device may be a digital camera, a smart phone, a mobile phone, a gaming machine, a TV, a display device, a head unit for a motor vehicle, a notebook computer, a laptop computer, a tablet computer, a PMP, a PDA, a navigation device, an ATM for banking, a POS device of a shop, or the like. Further, the electronic device of the present disclosure may be a flexible device or a flexible display unit.

Hereinafter, a detailed structure of an electronic device to which various embodiments of the present disclosure may be applied will be described by way of example with reference to FIG. 11.

FIG. 11 illustrates a detailed structure of an electronic device 100 according to an embodiment of the present disclosure.

Referring to FIG. 11, the electronic device 100 may include at least one of a control unit 110, a mobile communication module 120, a multimedia module 140, a camera module 150, an input/output module 160, a sensor module 170, a state indicator 171, a storage unit 175, a power supply unit 180, and a touch screen 190.

More specifically, the electronic device 100 may be connected with an external electronic device (not shown) by using at least one of the mobile communication module 120, a connector 165, and an earphone connecting jack 167. Further, the electronic device 100 may be wiredly or wirelessly connected with another portable device or another electronic device, for example, one of a mobile phone, a smart phone, a tablet PC, a desktop PC, and a server.

The mobile communication module 120, a sub communication module 130, and a broadcasting communication module 141 of the multimedia module 140 may be collectively called a communication unit. The sub communication module 130 may include at least one of a wireless LAN module 131 and a short range communication module 132. The multimedia module 140 may include at least one of an audio playback module 142 and a video playback module 143. The camera module 150 may include at least one of a first camera 151 and a second camera 152. Also, the camera module 150 may further include a flash 153, a motor 154, and a lens barrel 155. The input/output module 160 may include at least one of a button 161, a microphone 162, a speaker 163, a vibration element 164, the connector 165, and a keypad 166.

The control unit 110 may include a CPU 111, a read only memory (ROM) 112 storing a control program for controlling the electronic device 100, and a random access memory (RAM) 113 used as a storage area for storing external input signals or data of the electronic device 100 or for work performed in the electronic device 100. The CPU 111 may include a single core, a dual core, a triple core, or a quad core. The CPU 111, the ROM 112, and the RAM 113 may be connected to each other through an internal bus 114.

Further, the control unit 110 may control at least one of the mobile communication module 120, the multimedia module 140, the camera module 150, the input/output module 160, the sensor module 170, the storage unit 175, the power supply unit 180, the touch screen 190, and a touch screen controller 195.

Further, the control unit 110 may detect a user input event such as a hovering event occurring when an input unit 168 approaches the touch screen 190 or is located close to the touch screen 190. Further, the control unit 110 may detect various user inputs received through the camera module 150, the input/output module 160, and the sensor module 170, as well as the input unit 190. The user input may include various types of information input into the device 100, such as a gesture, a voice, pupil movement, iris recognition, and a bio signal of a user, as well as a touch. The control unit 110 may control the device 100 such that a predetermined operation or function corresponding to the detected user input is performed within the device 100. Further, the control unit 110 may output a control signal to the input unit 168 or the vibration element 164. Such a control signal may include information on a vibration pattern, and the input unit 168 or the vibration element 164 generates a vibration according to the vibration pattern.

Further, the electronic device 100 may include at least one of the mobile communication module 121, the wireless LAN module 131, and the short range communication module 132, depending on its capability.

Under the control of the control unit 110, the mobile communication module 121 allows the electronic device 100 to be connected with an external electronic device through mobile communication by using at least one (one or a plurality of) antenna (not shown). The mobile communication module 121 may transmit/receive a wireless signal for a voice call, a video call, a Short Message Service (SMS), or a Multimedia Message Service (MMS) to/from a mobile phone (not shown), a smart phone (not shown), a tablet PC (not shown), or another electronic device (not shown) having a phone number input into the electronic device 100.

The sub communication module 130 may include at least one of the wireless LAN module 131 and the short range communication module 132. As an example, the sub communication module 130 may include only the wireless LAN module 131, only the short range communication module 132, or both the wireless LAN module 131 and the short range communication module 132.

Under the control of the control unit 110, the wireless LAN module 131 may be connected to the Internet in a place where a wireless Access Point (AP) (not shown) is installed. The wireless LAN module 131 may support the IEEE802.11x standards of the Institute of American Electrical and Electronics Engineers (IEEE). Under the control of the control unit 110, the short range communication module 132 may wirelessly perform near field communication between the electronic device 100 and an external electronic device. The short range communication scheme may include Bluetooth, IrDA, Wi-Fi direct communication, Near Field Communication (NFC), and the like.

Under the control of the control unit 110, the broadcasting communication module 141 may receive a broadcasting signal (e.g., a TV broadcasting signal, a radio broadcasting signal, or a data broadcasting signal) and broadcasting supplement information (e.g., Electric Program Guide (EPG) or Electric Service Guide (ESG)), transmitted from a broadcasting station, through a broadcasting communication antenna (not shown).

The multimedia module 140 may include the audio playback module 142 or the video playback module 143. Under the control of the control unit 110, the audio playback module 142 may play back a stored or received digital audio file (e.g., a file having a file extension of mp3, wma, ogg, or wav). Under the control of the control unit 110, the video playback module 143 may play back a stored or received digital video file (e.g., a file having a file extension of mpeg, mpg, mp4, avi, mov, or mkv). The multimedia module 140 may be integrated in the control unit 110.

The camera module 150 may include at least one of the first camera 151 and the second camera 152 that photographs a still image, a video, or a panoramic picture under the control of the control unit 110. Further, the camera module 150 may include at least one of the lens barrel 155 that performs a zoom-in/out for photographing a subject, the motor 154 that controls the movement of the lens barrel 155, and the flash 153 that provides an auxiliary light source required for photographing a subject. The first camera 151 may be disposed on the front surface of the electronic device 100, and the second camera 152 may be disposed on the back surface of the electronic device 100.

The input/output module 160 may include at least one of at least one button 161, at least one microphone 162, at least one speaker 162, at least one vibration element 164, the connector 165, the keypad 166, the earphone connecting jack 167, and the input unit 168. However, the input/output module 160 is not limited thereto, and may include a mouse, a trackball, a joystick, or a cursor control such as cursor direction keys to control the movement of a cursor on the touch screen 190.

The button 161 may be formed on the front surface, side surface, or back surface of the housing (or case) of the electronic device 100, and may include at least one of a power/lock button, a volume button, a menu button, a home button, a back button, and a search button. Under the control of the control unit 110, the microphone 162 may receive an input voice or sound to generate an electric signal. Under the control of the control unit 110, the speaker 163 may output sounds corresponding to various signals or data (e.g., wireless data, broadcasting data, digital audio data, digital video data, etc.) to the outside of the electronic device 100. The speaker 163 may output sounds corresponding to functions performed by the electronic device 100 (e.g., a button operation sound, a ringtone, and a counterpart's voice corresponding to a voice call). One speaker 163 or a plurality of speakers 163 may be formed on an appropriate position or positions of the housing of the electronic device 100.

Under the control of the control unit 110, the vibration element 164 may convert an electric signal into a mechanical vibration. As an example, when the electronic device 100 in a vibration mode receives a voice or video call from another device (not shown), the vibration element 164 is operated. One vibration element 164 or a plurality of vibration elements 164 may be formed within the housing of the electronic device 100. The vibration element 164 may be operated in correspondence with a user input through the touch screen 190.

The connector 165 may be used as an interface for connecting the electronic device 100 with an external electronic device or a power source (not shown). The control unit 110 may transmit data stored in the storage unit 175 of the electronic device 100 to or receive data from an external electronic device through a wired cable connected to the connector 165. The electronic device 100 may receive power from a power source or charge a battery (not shown) by using the power source through the wired cable connected to the connector 165.

The keypad 166 may receive a key input for the control of the electronic device 100 from a user. The keypad 166 may include a physical keypad (not shown) formed in the electronic device 100 or a virtual keypad (not shown) displayed on the touch screen 190. The physical keypad formed in the electronic device 100 may be omitted depending on the capability or structure of the electronic device 100. An earphone (not shown) may be inserted into the earphone connecting jack 167 to be connected with the electronic device 100.

The input unit 168 may be kept inserted within the electronic device 100, and may be withdrawn or separated from the electronic device 100 when being used. An attachment/detachment recognition switch 169 that is operated in correspondence with the attachment/detachment of the input unit 168 may be provided in one area within the electronic device 100, into which the input unit 168 is to be inserted, and the attachment/detachment recognition switch 169 may output signals corresponding to the insertion and separation of the input unit 168 to the control unit 110. The attachment/detachment recognition switch 169 may be configured to be directly/indirectly contacted with the input unit 168 when the input unit 168 is inserted. Accordingly, the attachment/detachment recognition switch 169 may generate a signal corresponding to the insertion or separation (that is, a signal indicating the insertion or separation of the input unit 168), based on whether the attachment/detachment recognition switch 169 is connected with the input unit 168), and output the generated signal to the control unit 110.

The sensor module 170 may include at least one sensor for detecting a state of the electronic device 100. As an example, the sensor module 170 may include at least one of a proximity sensor for detecting whether a user approaches the electronic device 100, a light sensor (not shown) for detecting the amount of ambient light of the electronic device 100, a motion sensor (not shown) for detecting motion (e.g., rotation, acceleration, or vibration) of the electronic device 100, a geomagnetic sensor for detecting the point of the compass of the electronic device 100 by using the Earth's magnetic field, a gravity sensor for detecting the direction of gravity action, an altimeter for detecting altitude by measuring atmospheric pressure, and a GPS module 157.

The GPS module 157 may receive radio waves from a plurality of GPS satellites (not shown) on Earth's orbit and calculate a position of the electronic device 100 by using the time of arrival from each of the GPS satellites to the electronic device 100.

Under the control of the control unit 110, the storage unit 175 may store a signal or data input/output according to an operation of the communication module 120, the multimedia module 140, the camera module 150, the input/output module 160, the sensor module 170, or the input device 190. Further, according to an embodiment of the present disclosure, the storage unit 175 may store a variety of state information and setting information of the electronic device 100.

The storage unit 175 may store a control program and applications for controlling the electronic device 100 or the control unit 110. One of the control program and applications may be a messenger client application installed according an embodiment of the present disclosure.

The term "storage unit" may be used as a term that refers to any data storage device such as the storage unit 175, the ROM 112 or the RAM 113 within the control unit 110, or a memory card (e.g., an SD card or a memory stick) mounted in the electronic device 100. The storage unit 175 may include a non-volatile memory, a volatile memory, or a Hard Disk Drive (HDD), or a Solid State Drive (SSD).

Further, the storage unit 175 may store applications having various functions, such as navigation, video communication, gaming, and a time-based alarming for a user, images for providing a Graphical User Interfaces (GUIs) related to the applications, databases or data related to processing of user information, documents, and touch inputs, background images (menu screens, standby screens, etc.) or operating programs required to drive the electronic device 100, images photographed by the camera module 150, and the like.

Further, the storage unit 175 is a machine (e.g., computer)-readable medium, and the term "machine-readable medium" may be defined as a medium for providing data to a machine so as for the machine to perform a specific function. The storage unit 175 may include a non-volatile medium and a volatile medium. All such media should be of a type in which commands transferred by the media may be detected by a physical mechanism that reads the commands into a machine.

The computer readable storage medium includes, but is not limited to, at least one of a floppy disk, a flexible disk, a hard disks, a magnetic tape, a Compact Disc Read-Only Memory (CD-ROM), an optical disk, a punch card, a paper tape, a RAM, a Programmable Read-Only Memory (PROM), an Erasable PROM (EPROM), a flash-EPROM, and an embedded MultiMedia card (eMMC).

Under the control of the control unit 110, the power supply unit 180 may supply power to one battery or a plurality of batteries disposed in the housing of the electronic device 100. The one battery or the plurality of batteries supply power to the electronic device 100. Further, the power supply unit 180 may supply power, input from an external power source through a wired cable connected to the connector 165, to the electronic device 100. Further, the power supply unit 180 may supply power, wirelessly input from an external power source through a wireless charging technology, to the electronic device 100.

The electronic device 100 may include at least one touch screen 190 that provides a user with GUIs corresponding to various services (e.g., a phone call, data transmission, broadcasting, and photography). The touch screen 190 may output an analog signal corresponding to at least one user input into a GUI to the touch screen controller 195.

The touch screen 190 may receive at least one user input through a user's body (e.g., fingers including a thumb) or the input unit 168 (e.g., a stylus pen or an electronic pen) via a pen recognition panel 191. The touch screen 190 may be implemented in, for example, a resistive type, a capacitive type, an infrared type, an acoustic wave type, or a combination thereof.

Further, the touch screen 190 may include at least two touch panels capable of detecting a touch or approach of a finger or the input unit 168 in order to receive an input by each of the finger and the input unit 168. The at least two touch panels may output different output values to the touch screen controller 195, and the touch screen controller 195 may differently recognize the values input into the at least two touch screen panels to identify whether the input from the touch screen 190 is an input by a finger or an input by the input unit 168.

Further, an input into the touch screen 190 is not limited to a touch between the touch screen 190 and a user's body or a touchable input means, but may include a non-touch (e.g., the interval between the touch screen 190 and a user's body or a touchable input means is 1 mm or shorter). A threshold interval for detecting an input in the touch screen 190 may vary according to the capability or structure of the electronic device 100.

The touch screen controller 195 converts an analog signal input from the touch screen 190 into a digital signal, and transmits the converted digital signal to the controller 110. The control unit 110 may control the touch screen 190 by using the digital signal received from the touch screen controller 195. The touch screen controller 195 may determine a user input position and a hovering interval or distance by detecting a value (e.g., a current value, etc.) output through the touch screen 190, and may convert the determined distance value into a digital signal (e.g., a Z coordinate) and provide the digital signal to the control unit 110. Further, the touch screen controller 190 may detect a pressure applied to the touch screen 190 by a user input means by detecting a value (e.g., a current value, etc.) output through the touch screen 190, and may convert the detected pressure value into a digital signal and provide the converted digital signal to the control unit 110.

The methods according to various embodiments of the present disclosure as described above may be implemented in the form of program commands that can be executed through various computer means, and may be stored in a computer-readable recording medium. The computer-readable recording medium may include a program instruction, a data file, a data structure, and the like, solely or in combination. The program instruction recorded in the computer-readable recording medium may be either one that is specifically designed and configured for the present disclosure or one that is well-known to and used by a person having ordinary skill in the art of computer software.

Further, the methods according to various embodiments of the present disclosure may be implemented in the form of a program instruction and stored in the storage unit 150 of the above-described electronic device 100, and the program instruction may be temporarily stored in the RAM 113 included in the control unit 110 so as to execute the methods according to various embodiments of the present disclosure. Accordingly, the control unit 110 may control hardware components included in the device 100 in response to the program instruction of the methods according to various embodiments of the present disclosure, may temporarily or continuously store data generated while performing the methods according to various embodiments of the present disclosure in the storage unit 150, and may provide UIs required to perform the methods according to various embodiments of the present disclosure to the touch screen controller 172.

Figure 12:
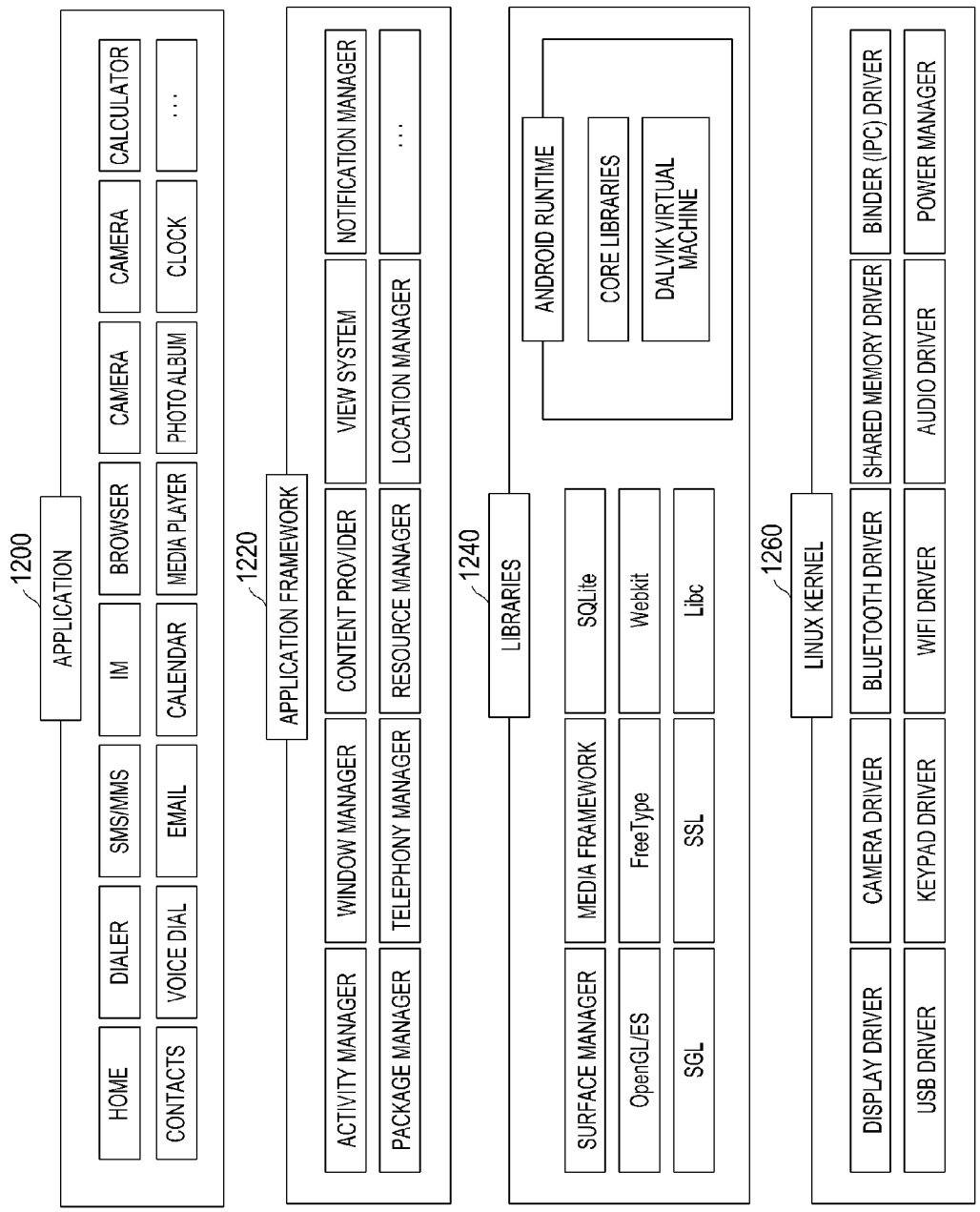
FIG. 12 is a block diagram illustrating a software architecture of an electronic device according to an embodiment of the present disclosure.

FIG. 12 illustrates a software architecture of a computer device according to an embodiment of the present disclosure.

Referring to FIG. 12, the software architecture of an electronic device to which various embodiments of the present disclosure are applicable may be classified into an application level 1200, an application framework level 1220, a library level 1240, a kernel level 1260, and the like.

The application level 1200 may include Home, Dialer, SMS/MMS, IM, Browser, two Cameras, Alarm, Calculator, Contacts, Voice Dial, Email, Calendar, Media Player, Photo Album, Clock, and the like. The application framework level 1220 may include Activity Manager, Window Manager, Content Provider, View System, Notification Manager, Package Manager, Telephony Manager, Resource Manager, Location Manager, and the like.

The library level 1240 may include Surface Manager, Media Framework, SQLite, OpenGL/ES, Free Type, Webkit, SGL, SSL, Libc, Android Runtime (Core Library, Dalvik Virtual Machine, etc.), and the like. The kernel level 1260 may include Display Driver, Camera Driver, Bluetooth Driver, Shared Memory Driver, Binder (IPC) Driver, USB Driver, Keypad Driver, Wi-Fi Driver, Audio Driver, Power Manager, and the like.

According to various embodiments of the present disclosure, when localization by feature detection is performed in image data, the performance of object pose calculation may be improved by performing the object pose calculation for an ROI after feature matching.

Further, when object pose calculation is performed, the minimum number of features required for feature matching and the processing time of the object pose calculation may be reduced by reducing the number of DoF.

Further, when 3D localization of an object included in image data is performed, the probability not to identify the object in the localization may be reduced by identifying the object included in the whole image in a two-dimensional manner and then performing the 3D localization for an ROI having a high probability of containing the object.

Various aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include Read-Only Memory (ROM), Random-Access Memory (RAM), CD-ROMs, magnetic tapes, floppy disks, and optical data storage devices. The non-transitory computer readable recording medium can also be distributed over network coupled computer systems so that the computer readable code is stored and executed in a distributed fashion. Also, functional programs, code, and code segments for accomplishing the present disclosure can be easily construed by programmers skilled in the art to which the present disclosure pertains.

At this point it should be noted that various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include Read-Only Memory (ROM), Random-Access Memory (RAM), CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present disclosure can be easily construed by programmers skilled in the art to which the present disclosure pertains.

While the present disclosure has been shown described with reference to various embodiments thereof, it will be understood by those skilled in the art that various changes in form and details may be made therein without departing from the spirit and scope of the present disclosure as defined by the appended claims and their equivalents.

What is claimed is:

1. A method for operating an electronic device, the method comprising:
    detecting a plurality of feature points in at least a partial region in a digital image;
    selecting at least two feature points from the detected plurality of feature points;
    determining whether there is a probability that an object existing in at least one of a plurality of reference images exists in the digital image, by using at least a portion of the at least two feature points;
    setting based on the determined result, a Region Of Interest (ROI) in which the at least two feature points selected in the digital image are included, in the digital image; and
    determining a pose of the object within the set ROI.

2. The method as claimed in claim 1, wherein the determining of whether there is the probability that the object exists in the digital image comprises determining whether two feature points of the object included in at least one of the reference images are matched to the at least two feature points selected in the digital image.

3. The method as claimed in claim 1, further comprising determining the pose of the object by using at least three feature points in the ROI.

4. The method as claimed in claim 1, further comprising:
    additionally detecting feature points in the ROI; and
    determining the pose of the object by using at least a portion of the additionally detected feature points.

5. The method as claimed in claim 1, further comprising:
    determining whether the ROI satisfies a selected condition; and
    additionally detecting feature points from the ROI when the selected condition is satisfied.

6. The method as claimed in claim 5, wherein the selected condition includes at least one of a size of the ROI, a position of the ROI, a number of the feature points, and a density of the feature points.

7. The method as claimed in claim 1, wherein the ROI comprises a region having a selected shape and including the at least two feature points selected.

8. An electronic device comprising:
    a memory configured to store a digital image; and
    a processor configured to process the digital image,
    wherein the processor is further configured to:
        detect a plurality of feature points in at least a partial region in the digital image,
        select at least two feature points from the detected plurality of feature points,
        determine whether there is a probability that an object existing in at least one of a plurality of reference images exists in the digital image, by using at least a portion of the at least two feature points,
        set, based on the determined result, a Region Of Interest (ROI), in which the at least two feature points selected in the digital image are included, in the digital image, and
        determine a pose of the object within the set ROI.

9. The electronic device as claimed in claim 8, wherein the processor is further configured to determine whether two feature points of the object included in at least one of the reference images are matched to the at least two feature points selected in the digital image.

10. The electronic device as claimed in claim 8, wherein the processor is further configured to determine the pose of the object by using at least three feature points in the ROI.

11. The electronic device as claimed in claim 8, wherein the processor is further configured to:
    additionally determine feature points in the ROI, and
    determine the pose of the object by using at least a portion of the additionally detected feature points.

12. The electronic device as claimed in claim 8, wherein the processor is further configured to:
    determine whether the ROI satisfies a selected condition, and
    additionally detect feature points from the ROI when the selected condition is satisfied.

13. The electronic device as claimed in claim 12, wherein the selected condition includes at least one of a size of the ROI, a position of the ROI, a number of the feature points, and a density of the feature points.

14. The electronic device as claimed in claim 8, wherein the ROI comprises a region having a selected shape and including the at least two feature points selected.

15. A non-transitory computer-readable storage medium storing instructions that, when executed, cause at least one processor to perform the method of claim 1.

* * * * *